US009857936B2

(12) United States Patent
Beilis et al.

(10) Patent No.: US 9,857,936 B2
(45) Date of Patent: *Jan. 2, 2018

(54) METHOD FOR SIMULATING SCREEN SHARING FOR MULTIPLE APPLICATIONS RUNNING CONCURRENTLY ON A MOBILE PLATFORM

(71) Applicant: Genesys Telecommunications Laboratories, Inc., Daly City, CA (US)

(72) Inventors: David Beilis, Toronto (CA); Adrian Lee-Kwen, Toronto (CA)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/243,857

(22) Filed: Aug. 22, 2016

(65) Prior Publication Data

US 2016/0357361 A1    Dec. 8, 2016

Related U.S. Application Data

(63) Continuation of application No. 14/479,197, filed on Sep. 5, 2014, now Pat. No. 9,424,111, which is a
(Continued)

(51) Int. Cl.
*G06F 3/00* (2006.01)
*G06F 17/00* (2006.01)
(Continued)

(52) U.S. Cl.
CPC .............. *G06F 3/0481* (2013.01); *G06F 3/00* (2013.01); *G06F 9/54* (2013.01); *G06F 9/546* (2013.01);
(Continued)

(58) Field of Classification Search
CPC ........................................................ G06F 9/54
(Continued)

(56) References Cited

U.S. PATENT DOCUMENTS 6,026,187 A * 2/2000 Siegel .................. G06F 17/211
345/629
7,199,802 B2 * 4/2007 Gusmorino ........... G06F 3/0481
345/589
(Continued)

FOREIGN PATENT DOCUMENTS

EP    0344082 A2 * 11/1989
EP    0344082 B1    11/1995

OTHER PUBLICATIONS

Gordon Kurtenbach, The Design of a GUI Paradigm based on Tablets, Tow-hands, and Transparency, 1997.*
(Continued)

*Primary Examiner* — Lechi Truong
(74) *Attorney, Agent, or Firm* — Lewis Roca Rothgerber Christie LLP (57) ABSTRACT

A system for sharing a physical display screen among multiple applications on a mobile platform includes an Internet-connected client device and software executing on the client device from a non-transitory physical medium, the software providing a first function assigning dominancy to one of the multiple running applications, a second function mitigating application background transparency among the multiple running applications, a third function establishing a messaging mechanism and protocol between the multiple running applications, and a fourth function enabling the dominant application to intercept digital input directed toward individual ones of the multiple running applications and to dispatch the input to the appropriate application.

15 Claims, 3 Drawing Sheets

Related U.S. Application Data continuation of application No. 13/459,820, filed on Apr. 30, 2012, now Pat. No. 8,881,170.

(51) Int. Cl.
| | | |
|---|---|---|
| *G06F 3/0481* | (2013.01) | |
| *G06F 17/21* | (2006.01) | |
| *G06F 9/54* | (2006.01) | |
| *G09G 5/377* | (2006.01) | |
| *G06F 17/30* | (2006.01) | |
| *H04W 88/02* | (2009.01) | |

(52) U.S. Cl.
CPC ........... *G06F 17/212* (2013.01); *G09G 5/377* (2013.01); *G06F 17/30289* (2013.01); *G06F 2203/04804* (2013.01); *G06F 2209/545* (2013.01); *H04W 88/02* (2013.01)

(58) Field of Classification Search
USPC ........................................................ 719/310
See application file for complete search history.

(56) References Cited

U.S. PATENT DOCUMENTS

| | | | |
|---|---|---|---|
| 8,007,362 B2 | 8/2011 | Aoyama et al. | |
| 8,341,543 B2* | 12/2012 | Shah | G06Q 10/02 715/200 |
| 8,520,072 B1* | 8/2013 | Slavin | G08B 13/19684 348/143 |
| 8,881,170 B2 | 11/2014 | Beilis et al. | |
| 2007/0220322 A1* | 9/2007 | Mikami | G06F 11/324 714/13 |
| 2008/0174564 A1 | 7/2008 | Kim et al. | |
| 2009/0287599 A1* | 11/2009 | Lamar, III | G06Q 20/10 705/39 |
| 2009/0298547 A1* | 12/2009 | Kim | G06F 1/162 455/566 |
| 2010/0171846 A1* | 7/2010 | Wood | H04N 1/00323 348/231.99 |
| 2011/0292078 A1* | 12/2011 | Lapstun | G06T 7/004 345/632 |
| 2012/0293325 A1* | 11/2012 | Lahcanski | G06F 3/011 340/539.13 |
| 2013/0065614 A1* | 3/2013 | Jung | H04M 1/72522 455/456.3 |
| 2013/0290982 A1 | 10/2013 | Beilis et al. | |

OTHER PUBLICATIONS

Hinckley, Ken, et al., Stitching: Pen Gestures that Span Multiple Displays, ACM 2004, 9 pages.

Ishii, Hiroshi et al., Toward an open shared workspace: Computer and Video Fusion Approach od Teamworkstation, 12, 1991, 14 pages.

* cited by examiner

METHOD FOR SIMULATING SCREEN SHARING FOR MULTIPLE APPLICATIONS RUNNING CONCURRENTLY ON A MOBILE PLATFORM

CROSS-REFERENCE TO RELATED APPLICATIONS

This application is a continuation of U.S. patent application Ser. No. 14/479,197, filed on Sep. 5, 2014, now U.S. Pat. No. 9,424,111, which is a continuation of U.S. patent application Ser. No. 13/459,820, filed on Apr. 30, 2012, now U.S. Pat. No. 8,881,170, the content of all of which are incorporated herein by reference.

BACKGROUND OF THE INVENTION

1. Field of the Invention

The present invention is in the field of mobile communications and networking and pertains particularly to methods and apparatus for simulating physical screen sharing for multiple running applications on a mobile computing platform.

2. Discussion of the State of the Art

In the field of mobile communications, hand-held computing appliances are available that provide user-access to the Internet and facilitate network and telephony communications. More recently a Linux-based platform called the Android mobile platform has been developed for mobile computing. On the Android platform as well as on other mobile computing platforms, the dominant running application assumes entire control of the physical display screen on the mobile device. Other applications that may be loaded (executed) and running on the device sit in the background in a passive state until manually selected as the top application.

There are some applications that contain multiple separate windows that receive and display updated information such as home screen widgets on the Android platform and Pop-up intent windows like the voice recognition intent provided by Google™. Home screen widgets on the Android platform and other summary display pages (web pages) are simple snapshots of dynamically updated data. One limitation with widgets is that they are dependant on a home screen. Any one of these widgets expanded takes up the entire physical display. The voice recognition intent application by Google™ assumes control over the entire physical display leaving any other running application in a passive state.

In mobile computing, there is a desire to allow multiple independent applications to run in parallel wherein those running applications may update the physical display simultaneously. The Android framework includes the concept of forming "Intent" which also includes key/value pairs of messages allowing for requests and responses between applications. For example, it is a common practice to send an intent to a native dialer application from another running application to implement calling functionality. Another example may be using native email application to send a new email. A limitation with the current technology dictates that only a single application may control the entire physical display on the mobile appliance. To work with and display information from non-active applications executed and running on the device, a user must select the application and engage in manual task performance to replace the original display with new data from the other application.

Therefore, what is currently needed in the art is a system and methods for simulating physical screen sharing among multiple running applications on a mobile device. Such a system would improve efficiency and reduce overall task performance requirements of the user.

SUMMARY OF THE INVENTION

A problem stated above is that visual access to updated information is desirable for a mobile platform running two or more applications, but many of the conventional means for presenting the information for display, such as by navigating tabs and manual update selection, also create more task performance requirements. The inventors therefore considered functional elements of a mobile computing platform, looking for elements that exhibit interoperability that could potentially be harnessed to provide concurrent display of updated information from two or more applications sharing a physical display screen, but in a manner that would not include more manual task.

Every mobile computing device is capable of supporting multiple running applications, one by-product of which is increased manual task performance required to manually update the applications and visualize updated display of the most recent information for any of the multiple applications. Most such mobile platforms employ software such as tabulation mechanism to enable users to switch between multiple running applications in order to visualize updated output and to perform other application tasks in accordance with the type of application selected as the dominant or active application on the device, and software is typically a part of such apparatus.

The present inventor realized in an inventive moment that if, during runtime of two or more applications that require screen space, updated information from each application could be caused to display in such a manner that all of the most recent data for each application is visible to a user regardless of which application is in use, significant manual task reduction relative to accessing updated information might result. The inventor therefore constructed a unique system for simulating sharing of a physical display screen among multiple running applications on a mobile platform that allowed the user to see relevant updates and output resulting from user input in a dynamic fashion. A significant reduction in tasks required to toggle application data display between the multiple applications results, with no impediment to efficiency or data access time created.

Accordingly, in an embodiment of the present invention, A system for sharing a physical display screen among multiple applications on a mobile platform includes an Internet-connected client device and software executing on the client device from a non-transitory physical medium, the software providing a first function assigning dominancy to one of the multiple running applications, a second function mitigating application background transparency among the multiple running applications, a third function establishing a messaging mechanism and protocol between the multiple running applications, and a fourth function enabling the dominant application to intercept digital input directed toward individual ones of the multiple running applications and to dispatch the input to the appropriate application.

In one embodiment, the mobile platform is an android platform. In one embodiment, at least one of the multiple running applications is executed by another of the multiple running applications. In one embodiment, the Internet-connected client device is an android device. In one embodiment, the application most recently executed to run is the dominant application. In one embodiment, at least one of the multiple running applications is a telephony communications application. In a variation of this embodiment, the telephony communications application enables voice and video communications. In one embodiment, assignment of dominancy to one of the multiple running applications is a default operation. In one embodiment, the digital input is user supplied or server supplied.

According to another aspect of the present invention, a method for sharing a physical display screen among multiple applications on a mobile platform is provided and includes the steps (a) using a layered approach, stacking the applications one over another and assigning dominancy to one of the multiple running applications, (b) rendering the backgrounds of each application transparent, (c) intercepting digital input intended for one of the multiple running applications at the dominant application, (d) using a messaging protocol, sending the digital input to the intended target application from the dominant application, and (e) mitigating the transparency of the receiving application to display the output relevant to the input received in (d).

In one aspect of the method, the mobile platform is an android platform. In another aspect, at least one of the multiple running applications is executed by another of the multiple running applications. In one aspect, the Internet-connected client device is an android device. In one aspect, at least one of the multiple running applications is a telephony communications application. In a variation of this aspect, the telephony communications application enables voice and video communications. In one aspect, assignment of dominancy to one of the multiple running applications is a default operation.

In one aspect of the method, in step (c), the input includes user supplied input or input received from a server. In another aspect, in step (b), transparency is achieved using an android style command. In one aspect, in step (e), mitigation includes selecting the relevant application and removing at least some of the background transparency for display purposes. In all aspects, two or more of the applications run in parallel and display updated information visible through transparent backgrounds of overlying applications.

DETAILED DESCRIPTION

The inventors provide a unique system for simulating physical screen sharing among multiple running applications on a mobile appliance. The present invention will be described in enabling detail using the following examples, which may describe more than one relevant embodiment falling within the scope of the present invention.

Figure 1:
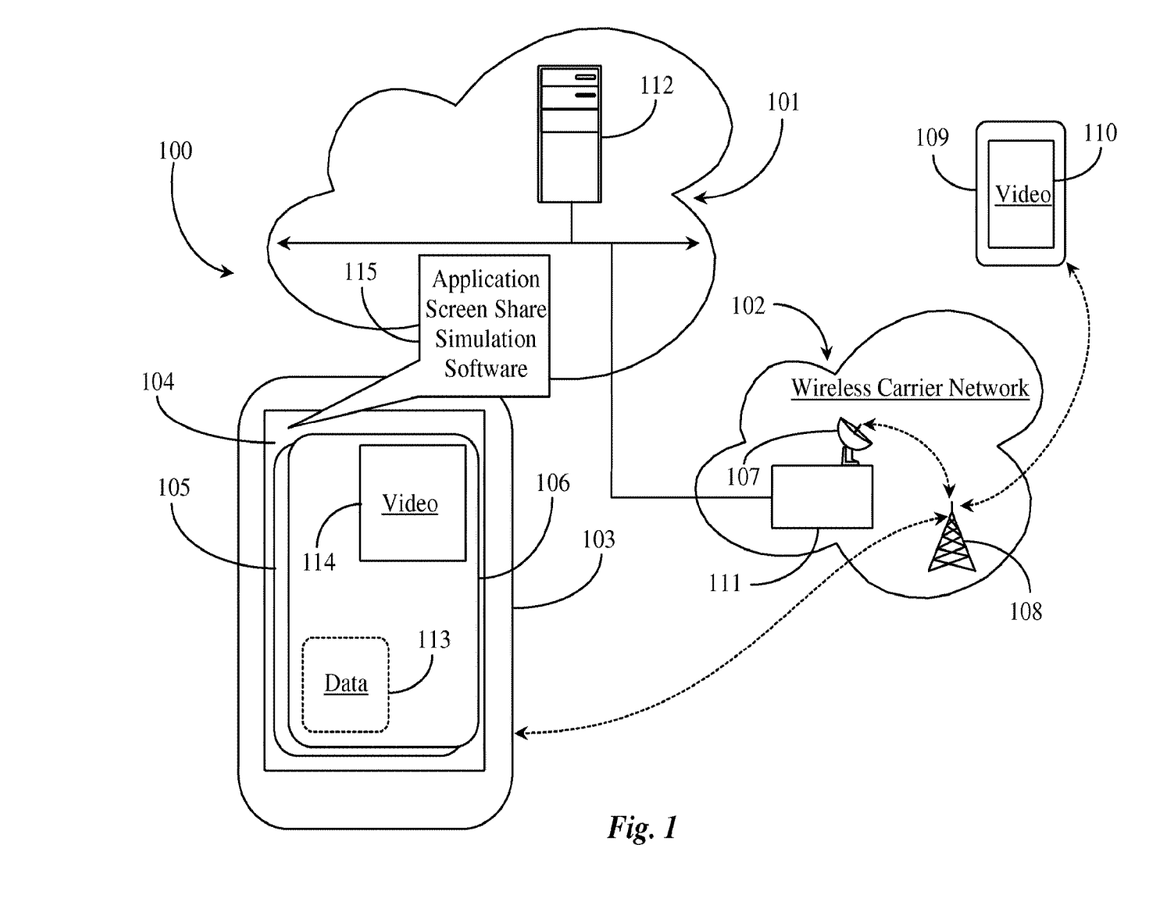
FIG. 1 is an architectural diagram of a mobile communications network supporting simulated screen sharing of a physical display screen by multiple running applications.

FIG. 1 is an architectural diagram of a mobile communications network 100 supporting simulated screen sharing of a physical display screen by multiple running applications. Communications network 100 includes an Internet network 101 and a wireless carrier network 102. Wireless communications network 102 includes a wireless Internet service provider 111. Wireless service provider 111 includes all of the equipment and software required to provide Internet connectivity for clients connected to wireless carrier network 102. Wireless carrier network 102 may be any wireless carrier network including cellular, wireless fidelity (WiFi), satellite network, or the like that provides communication between wireless subscribers or clients.

Wireless carrier network 102 provides connectivity for full multi-media communications and Internet access for client mobile devices 103 and 109, for example. A cellular tower 108 and a transceiver 107 exemplify connectivity between client devices 103 and 109 and Internet connectivity for those devices via wireless Internet service provider 111. Internet 101 is further exemplified by a network backbone representing all of the lines, equipment, and access points that make up the Internet network as a whole. Therefore, there are no geographic limitations to the practice of the present invention. One with skill in the art of network communications will appreciate that there may be multiple carrier networks including the well-known public switched telephony network (PSTN) assumed present in this example without departing from the spirit and scope of the present invention. Likewise gateways, including network bridging facilities and multimedia gateways may also be assumed present in this example without departing from the spirit and scope of the present invention.

Mobile client device 103 may be any mobile communications device capable of telecommunications and network navigation. Such devices may include a smart phone, a personal digital assistant (PDA), a notebook computer, a laptop computer, an android device, an iPad, or similar products. Mobile device 103 includes a non-transitory physical medium containing all of the software, firmware, and data required to enable function as a fully wireless communications appliance running a mobile platform such as the well-known android platform. Mobile device 103 includes a physical display screen 104. Mobile device 105 has a first application running that uses physical display screen 104. A second application 106 is also running on mobile device 103. Application 106 also uses physical display screen 104. In this example, application 106 is a telecommunications video application. Application 105 may be any type of running application that requires display 104 for updating its display of information.

Mobile device 103 includes application screen share simulation software 115 executed from a non-transitory physical medium and running in the background. Software 115 enables dynamic simulated screen sharing for applications 105 and 106 in this example. Application 106 is running directly on top of application 105 in an application stack. In one embodiment, application 106 is executed from controls appended to application 105. Software 115 includes a function for mitigating background transparency of application 106 so that a user may see the updated data 113 relative to application 105 through the transparent background of application 106. In one embodiment, the function is enabled on an android platform using an android control (android: theme="@style/Theme.Transparent"). Other transparency controls may be provided for other wireless mobile computing platforms without departing from the spirit and scope of the present invention.

In a preferred embodiment, the transparency control is dynamic and self-regulating so that multiple running applications stacked using a layered approach have visible displays that are geographically brokered to allow them show through multiple transparent application backgrounds to the physical display for user consumption. Software 115 includes a function for enabling dynamic messaging between multiple applications running on device 103 such as applications 105 and 106 in this example. There may be more than two applications stacked on device 103 all sharing display screen 104 without departing from the spirit and scope of the present invention. The inventor illustrates two such applications and deems the illustration sufficient for explanation of the present invention.

Software 115 also includes a function for assigning dominancy to one of the running applications for messaging control. In one embodiment such as assignment is by default, given to the last executed application, or the application that is running on top of the application stack. In this example, the dominant application would be application 106. In one embodiment, application 105 is enabled with the aid of software 115 (messaging protocol) to execute application 106 and command the application to perform a task. In one example, application 105 might be a weather application and application 106 might be a telephony communications application. In such a scenario, application 105 might be enabled with the aid of software 115 (messaging protocol) to execute application 106 to run and to command application 106 to launch a video call for example. In this example, video 114 is running in a pre-selected corner of physical display 104 with the rest of the application background rendered significantly transparent.

Software 115 includes a fourth function for enabling the dominant application, in this case, application 106 to intercept digital input directed toward application 105. The digital input might be user input applied by data input mechanism or server received digital input such as a timed data update to the application. Internet network 101 includes an Internet server 112. Internet server 112 includes a non-transitory physical medium containing all of the software and data required to enable function as an Internet network server. Server 112 may, in this case deliver timed whether updates to application 105. In one embodiment, those updates are intercepted by application 106 and forwarded, via the messaging mechanism, to application 105 for display in data window 113. Software 115 mitigates the background transparency of application 106 so that updated data output 113 is visible to the user.

In one embodiment, application 105 is natively enabled to call one or more secondary applications. In another embodiment, software 115 provides the integration of this capability dynamically using the knowledge of available applications loaded on the device. In this example, the video call is launched to another user operating mobile device 109. On device 109, the video call occupies the full display screen. Mobile device 109 may also have software 115 installed thereon and running to provide the same functionality for that device. The messaging protocol and mechanism used by software 115 might be a proprietary mechanism or an existing mechanism with modification to enable dynamic intercept and forward of information between applications.

Any application running over top of the bottom most application is aided by software 115 in defining their display layout with window dimensions that result in a display that is smaller than the physical display and to ensure the rest of the display is sufficiently transparent via the android theme control or an equivalent if another platform is used. The application sitting at the top of the stack would get all the input from the user or from a server such as server 112. To allow the user and or server to provide input to the other applications the top most application would intercept all such user and server events and dispatch them to the underlying applications via the proprietary messaging mechanism.

Transparency may be dynamically mitigated by each application in the stack based on collective information from all of the running applications running below the mitigating application in the stack. Moreover, applications running below the topmost application that receives user and server events may be enabled by software 115 to implement timers to ensure they continue to run, and to have their onPause/onResume methods (native application controls) dynamically modified to be listening for the state of running in parallel with one or more other applications. In this way, one or more applications running below the dominant application in the stack automatically display output resulting from user input or server input in a way that the user can see on the physical display.

Figure 2:
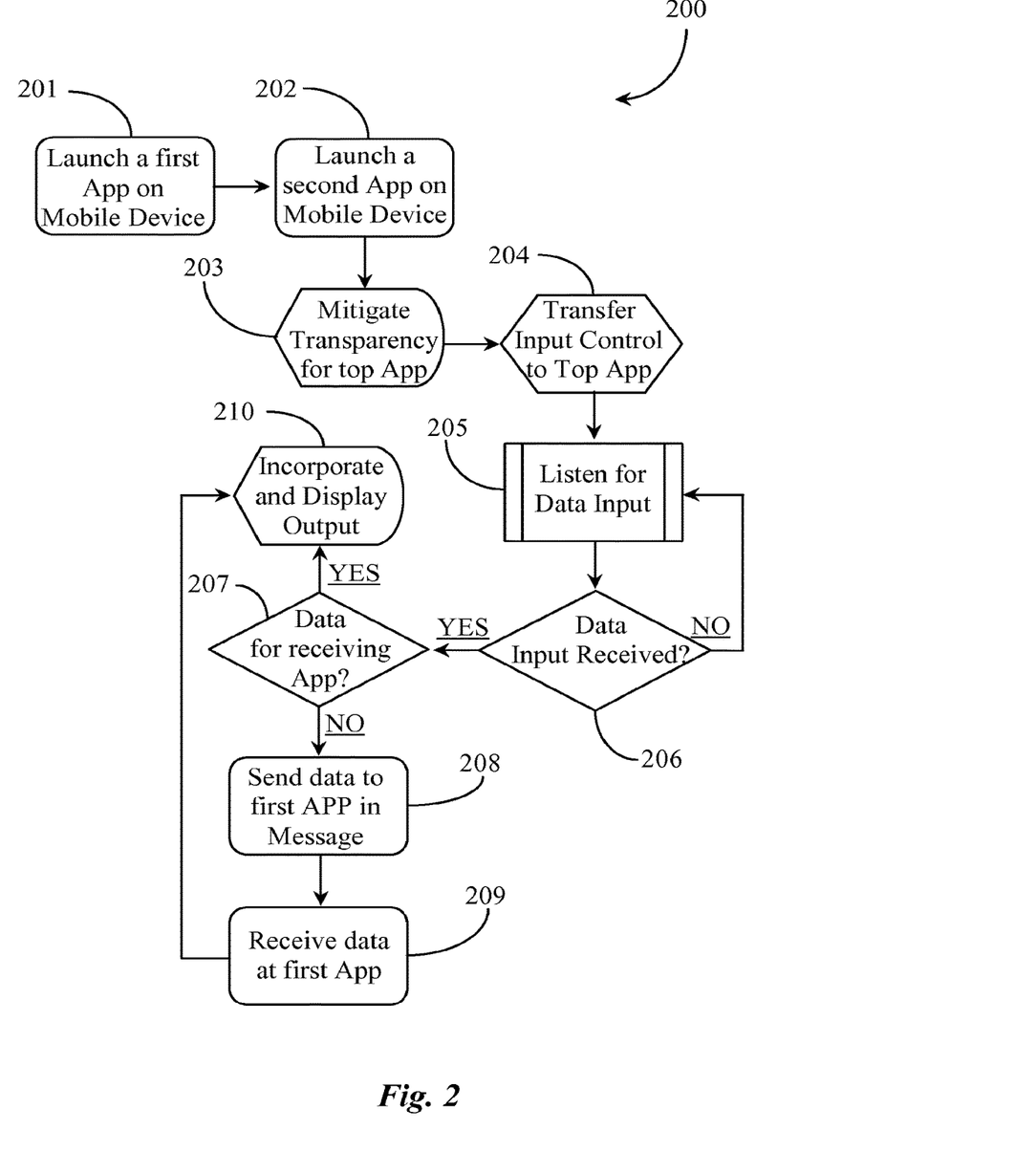
FIG. 2 is a process flow chart illustrating steps for enabling simulated screen sharing.

FIG. 2 is a process flow chart 200 illustrating steps for enabling simulated screen sharing. At step 201, a user operating a mobile device running software analogous to software 115 of FIG. 1 launches a first application (App) on the mobile device. The device may or may not be connected to an Internet server such as server 112 of FIG. 1. Server involvement depends on the nature of the first application launched. If the application is a game application for example, the device may be connected to a game server during this process flow. However, the mobile device is not required to have an active Internet connection in order to practice the present invention.

At step 202, the user operating the mobile device launches a second application on the mobile device. In one embodiment, the second application may be launched from controls provided to the first application. Such controls might be native controls or controls provided through an integration process enabled by the software of the present invention. At step 203, the second application mitigates background transparency to allow a display of the first application to show through to the physical display. The software of the invention may provide knowledge of what part of the display to render transparent. Step 203 is performed dynamically while both applications are running in a preferred embodiment.

At step 204, input control is transferred from the first application to the second or "top" application in the application stack. Assignment of this control may be made by default to the latest executed or top application in the stack. In this example the top application is the second application. In another embodiment, the user may assign dominancy to any one of multiple running applications manually. At step 205, the second or dominant application listens for data input. Data input may comprise user input manifested through normal input mechanisms or server input sent from an Internet server or even another user operating another device or appliance connected to the network that has user permissions to control the screen of the first user.

At step 206, the second application determines if data input was received. If it is determined that no data was received at step 206, the process loops back until data receipt is registered. If it is determined that data was received at step 206, it is next determined at step 207 if the data received is intended for the receiving dominant application. If it is determined at step 207 that the data received is for the dominant application, the process skips to step 210 where the input data is incorporated and displayed for output. The display area is a non-transparent area that does not overlie the designated display area for the underlying or first application.

If it is determined at step 207 that the data received is not intended for the receiving application, the process moves to step 208 where the data is dispatched using a messaging mechanism to the first application. In the case of more than one underlying application, the dominant application determines through addressing of the message, which of the underlying applications should get the input. At step 209, the input data dispatched by the second application is received by the first application. At step 210, the first application incorporates the input and displays the appropriate output through the transparent background of the dominant application so the user may readily visualize the displayed information.

Figure 3:
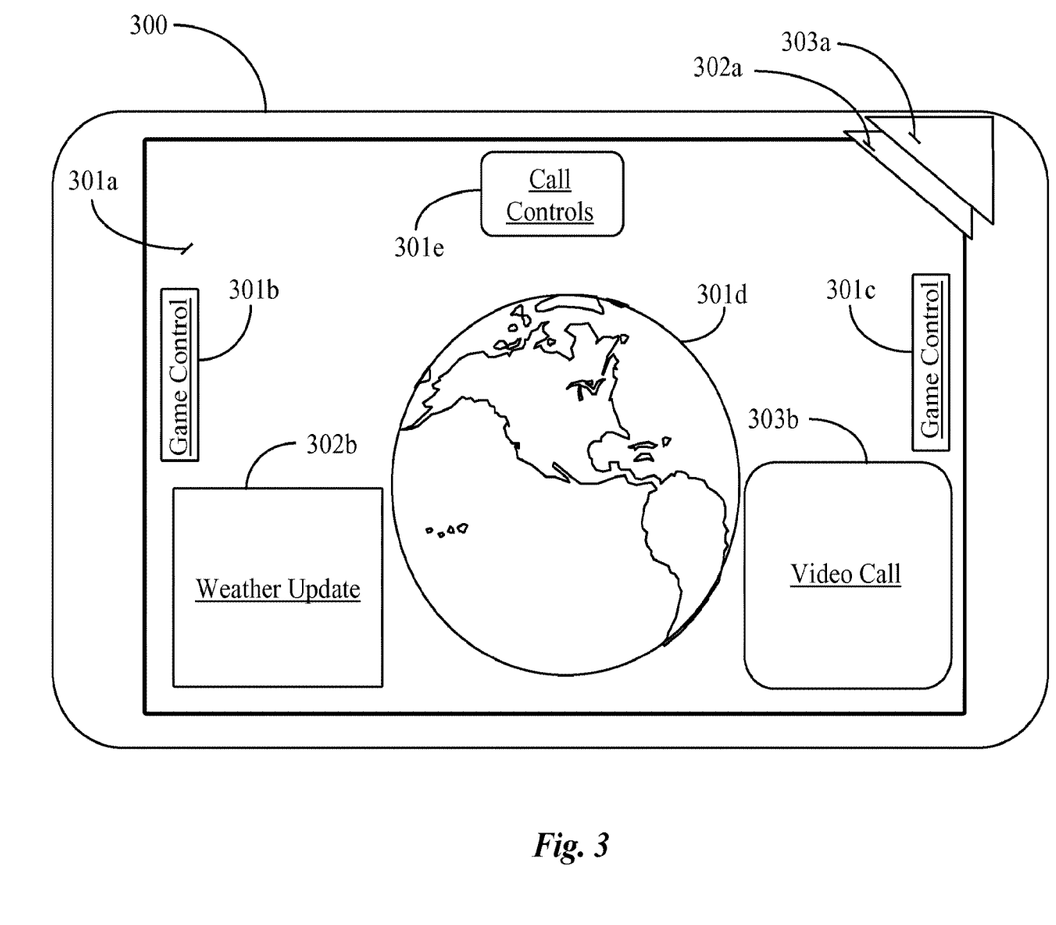
FIG. 3 is a block diagram illustrating dynamic screen share simulation by multiple applications.

FIG. 3 is a block diagram illustrating dynamic screen share simulation by multiple applications. A mobile device 300 is illustrated in this example and may be analogous to device 103 of FIG. 1. Device 300 includes a physical display that has three running applications all dynamically sharing the physical display area simultaneously. The underlying or first application on bottom of the application stack is a game application 301a. The second running application is application 302a illustrated as overlaying the first application in the stack (upper left corner of physical display). The third application is application 303a, which is the top most application in the stack of running applications (see upper left corner of physical display).

The top two applications mitigate transparency of their backgrounds to enable underlying applications to display updated information to the physical display so that the user may see relevant updates from all three running applications. Game application 301a is the bottom most application in the application stack. Game application 301a includes game controls 301b and 301c. Game application 301a includes game terrain 301d and call controls 301e. Call controls 301e represent a telephony integration that enables the user to launch a telephony application such as application 303a from within game application 301a.

In one embodiment, game application 301a is enhanced to enable a session initiation protocol (SIP) message to be sent to telephony application 303a to launch a video call represented by video call window 303b. The message includes at least minimum parameters like target SIP universal resource indicator (URI), rendered video size (left, top, width, height), and application identification (App ID), such as android package name and intended activity. In one embodiment, a desired corner of the physical display could be alternately requested for automatic video window positioning. Similarly, other messages are introduced in a preferred embodiment to provide call control features such as end call, call transfer, put on hold, call forward, and video options like video resize and video window relocation on the physical display screen.

Weather application 302a includes a weather update window 302b. In this example there are three running applications that simultaneously share the physical display of mobile device 300. In this example, the game application is launched followed by the weather application. The weather application mitigates its background transparency to enable the user to continue game play. Weather application 302a mitigates the size and on-screen location of its non-transparent weather application window 302b so that it does not overlay game controls or features enabling the user to continue game play while checking weather updates. Weather application 302a might be launched separately from game application 301a or from within the game application. Weather application 302a may dynamically receive information from game application 301a relevant to the important parts of the game application and their locations on screen to aid it in determining its own non-transparent weather update window 302b, thus rendering the rest of the application background significantly transparent.

The operating user may launch telephony application 303a from within game application 301a or separately if desired. The messaging mechanism is used to enable the applications to share and incorporate information relative to application features that will show through transparent backgrounds. Therefore, telephony application 303a mitigates its own background transparency based on information received from all of the underlying applications, in this case game application 301a and weather application 302a. With this relevant information, telephony application arranges a non-transparent video call window 303b in a size and location to dynamically avoid overlying important features of the underlying applications. The result is that the operating user may play game application 301a, view weather updates in window 302b, and conduct a telephony session, in this case a video call, using controls 301e while viewing the called party in window 301e.

Each application in the application stack is running in parallel with control for updates assigned to the dominant application in the stack namely video application 303a. As long as telephony application 303a is open it may intercept user and server input intended for the game application and for the weather application. Intercepting user and server events and dispatching them to respective underlying applications for incorporation and resulting displayed output does not significantly affect application performance. The practical number of applications that may run concurrently in an application stack where background transparency is mitigated and one application receives all user and sever events for it and the other applications is dependant only upon practical physical display space available and the requirements of each application in the stack.

In one embodiment, non-transparent display areas of underlying applications may also be rendered transparent in a dynamic fashion such as when no user or server events are currently registered for that application. That is to say the entire application background for any application in the stack may be transparent until there is a registered event received that will result in an update to the display, which then may be dynamically rendered non-transparent so the window will appear to the operating user. It is noted herein that with multiple running applications sharing the physical display, call controls for executing and controlling a telephony session may be integrated with any application in the stack. In the instant example, the game application 301a has the highest frequency of user events and server events if the game is being played online. Therefore it is logical that the telephony controls might be integrated with the game application.

The nature of game application 301a suggests that user events and server events are relatively constant during game play and since the application is the bottom most application no background transparency is required. The nature of weather application 302a suggests that weather updates delivered by timed server updates suggests that weather window 302b need not be continually non-transparent. Another application with a transparent background with periodic server updates may use the same geographic space. The applications sharing this space may alternate their non-transparent displays in the same geographic region or area of the physical display. In one embodiment, the average frequency of updates and graphics display requirements of the application may be considered in assigning application control.

In one embodiment the solution is implemented on an android platform which is Linux-based, however this should not be construed as a limitation of the present invention.

Although platforms such as iOS by Apple™ currently do not provide the capability for screen sharing among multiple applications or mitigation of background transparency, modification of platform capability can be undertaken to enable the present invention to be practiced on such platforms. It should also be noted herein that application of the present invention is not limited to mobile devices or appliances.

It will be apparent to one with skill in the art that the screen-sharing simulation system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A system for sharing a physical display screen among a plurality of applications on a mobile platform, comprising:
   a processor; and
   memory, the memory storing instructions that, when executed by the processor, cause the processor to:
   host a plurality of running applications on the mobile platform;
   receive in a first application of the plurality of running applications, information associated with an application feature for a second application of the plurality of running applications;
   determine a portion of a background of the first application that overlays a location of the application feature for the second application and render transparent the determined portion of the background of the first application to allow the application feature for the second application to show through via the physical display screen;
   launch a third application; and
   adjust a size of the application feature of the third application such that the application feature of the third application does not overlay a location of the application feature for the second application;
   render transparent an application feature of the first application until an event is registered for the first application; and
   responsive to the event, render non-transparent the application feature of the first application for a determinant period of time.

2. The system of claim 1, wherein the memory further includes instructions that cause the processor to:
   receive in the first application information relative to the application feature for a third application of the plurality of running applications; and
   determine a first portion of a background of the first application that overlays the location of the application feature for the second application and the location of the application for the third application, and render transparent the determined portion of the background of the first application to allow the application features for the second and third applications to show through to the physical display screen.

3. The system of claim 2, wherein the memory further includes instructions that cause the processor to:
   receive in the first application information relative to the application feature for the third application of the plurality of running applications; and
   determine a second portion of a background of the first application that does not overlay the location of the application feature for the second application, and render a non-transparent application feature of the first application in the second portion.

4. The system of claim 1, wherein the information relative to the application features for the second application includes location and size information, and the memory further include instructions that cause the processor to:
   determine a second portion of the background of the first application that does not overlay a location and size of the application feature for the second application, and render an application feature of the first application in the second portion for display on the physical display screen.

5. A system for sharing a physical display screen among a plurality of applications on a mobile platform, comprising:
   a processor; and
   memory, the memory storing instructions that, when executed by the processor, cause the processor to:
   host a plurality of running applications on the mobile platform;
   receive in a first application of the plurality of running applications, information associated with an application feature for a second application of the plurality of running applications;
   determine a portion of a background of the first application that overlays a location of the application feature for the second application and render transparent the determined portion of the background of the first application to allow the application feature for the second application to show through via the physical display screen;
   launch a third application;
   adjust a size of the application feature of the third application such that the application feature of the third application does not overlay a location of the application feature for the second application, wherein the third application overlays the second application, and the information relative to the application features for the second and third applications includes update information;
   determine from the update information that the application features for the second and third applications are periodically updated;
   determine the first portion of the background of the first application such that the application features for the second and third applications overlay one another;
   render as non-transparent the application feature of the second application in the first portion; and
   render as non-transparent the application feature of the third application in the first portion for a determinant period of time conditioned upon an update for the third application being received.

6. A system for sharing a physical display screen among a plurality of applications on a mobile platform, comprising:
   a processor; and
   memory, the memory storing instructions that, when executed by the processor, cause the processor to:
   host a plurality of running applications on the mobile platform;
   receive in a first application of the plurality of running applications, information associated with an application feature for a second application of the plurality of running applications;
   determine a portion of a background of the first application that overlays a location of the application feature for the second application and render transparent the determined portion of the background of the first application to allow the application feature for the second application to show through via the physical display screen;

launch a third application;

adjust a size of the application feature of the third application such that the application feature of the third application does not overlay a location of the application feature for the second application, wherein the information relative to the application features for the second and third applications includes size information, and the system includes information indicating a position of each applications in an application stack for each application, use the size and location of application features for each application below it in the application stack;

determine portions of the background of the application that overlay the application features for the applications below it in the application stack; and render the overlaying portions transparent.

7. The system of claim 6, wherein the memory further includes instructions that cause the processor to:

for each application, using the size and location of application features for each application below it in the application stack, determine a portion of the background of the application that does not overlay the application features for the applications below it in the application stack, and render an application feature of the application in the non-overlaying portion of the background of the application.

8. A method for sharing a physical display screen among a plurality of applications on a mobile platform, the mobile platform having a processor, comprising:

hosting, by the processor, a plurality of running applications;

receiving, by the processor, in a first application of the plurality of running applications information associated with an application feature for a second application of the plurality of running applications;

determining, by the processor, a portion of a background of the first application that overlays the location of the application feature for the second application and render transparent the determined portion of the background of the first application to allow the application feature for the second application to show through via the physical display screen;

launching, by the processor, a third application; and adjusting, by the processor, a size of the application feature of the third application such that the application feature of the third application does not overlay a location of the application feature for the second application;

rendering transparent an application feature of the first application until an event is registered for the first application; and responsive to the event, rendering non-transparent the application feature of the first application for a determinant period of time.

9. The method of claim 8, wherein the method further includes:

receiving in the first application information relative to the application feature for a third application of the plurality of running applications; and determining a first portion of a background of the first application that overlays the location of the application feature for the second application and the location of the application for the third application, and rendering transparent the determined portion of the background of the first application to allow the application features for the second and third applications to show through to the physical display screen.

10. The method of claim 9, wherein the method further includes:

receiving in the first application information relative to the application feature for the third application of the plurality of running applications; and determining a second portion of a background of the first application that does not overlay the location of the application feature for the second application, and rendering a non-transparent application feature of the first application in the second portion.

11. The method of claim 8, wherein the information relative to the application features for the second application includes location and size information, and the method further includes:

determining a second portion of the background of the first application that does not overlay a location and size of the application feature for the second application, and rendering an application feature of the first application in the second portion for display on the physical display screen.

12. The method of claim 8, wherein the method further includes: adjusting a size of the application feature of the first application such that the application feature of the first application does not overlay a location and size of the application feature for the second application.

13. A method for sharing a physical display screen among a plurality of applications on a mobile platform, the mobile platform having a processor, comprising:

hosting, by the processor, a plurality of running applications;

receiving, by the processor, in a first application of the plurality of running applications information associated with an application feature for a second application of the plurality of running applications;

determining, by the processor, a portion of a background of the first application that overlays the location of the application feature for the second application and render transparent the determined portion of the background of the first application to allow the application feature for the second application to show through via the physical display screen;

launching, by the processor, a third application;

adjusting, by the processor, a size of the application feature of the third application such that the application feature of the third application does not overlay a location of the application feature for the second application;

rendering transparent an application feature of the first application until an event is registered for the first application; and responsive to the event, rendering non-transparent the application feature of the first application for a determinant period of time, wherein the third application overlays the second application, and the information relative to the application features for the second and third applications includes update information;

determining from the update information that the application features for the second and third applications are periodically updated;

determining the first portion of the background of the first application such that the application features for the second and third applications overlay one another;

rendering as non-transparent the application feature of the second application in the first portion; and rendering as non-transparent the application feature of the third application in the first portion for a determinant period of time conditioned upon an update for the third application being received.

14. A method for sharing a physical display screen among a plurality of applications on a mobile platform, the mobile platform having a processor, comprising:

hosting, by the processor, a plurality of running applications;

receiving, by the processor, in a first application of the plurality of running applications information associated with an application feature for a second application of the plurality of running applications;

determining, by the processor, a portion of a background of the first application that overlays the location of the application feature for the second application and render transparent the determined portion of the background of the first application to allow the application feature for the second application to show through via the physical display screen;

launching, by the processor, a third application; and adjusting, by the processor, a size of the application feature of the third application such that the application feature of the third application does not overlay a location of the application feature for the second application;

rendering transparent an application feature of the first application until an event is registered for the first application;

responsive to the event, rendering non-transparent the application feature of the first application for a determinant period of time, wherein the information relative to the application features for the second and third applications includes size information;

providing information indicating a position of each application in an application stack;

for each application, using the size and location of application features for each application below it in the application stack;

determining portions of the background of the application that overlay the application features for the applications below it in the application stack, and rendering the overlaying portions transparent.

15. The method of claim 14, wherein the method further includes:

for each application, using the size and location of application features for each application below it in the application stack, determining a portion of the background of the application that does not overlay the application features for the applications below it in the application stack, and rendering an application feature of the application in the non-overlaying portion of the background of the application.

* * * * *